(12) United States Patent
Park et al.

(10) Patent No.: US 11,122,349 B2
(45) Date of Patent: Sep. 14, 2021

(54) SERVER AND SYSTEM FOR CONTROLLING SMART MICROPHONE

(71) Applicant: I-SCREAM MEDIA CO., LTD., Seongnam-si (KR)

(72) Inventors: Ki Seok Park, Seongnam-si (KR); Ki Bok Nam, Gwangju-si (KR)

(73) Assignee: I-SCREAM MEDIA CO., LTD., Seongnam-si (KR)

( * ) Notice: Subject to any disclaimer, the term of this patent is extended or adjusted under 35 U.S.C. 154(b) by 0 days.

(21) Appl. No.: 16/815,428

(22) Filed: Mar. 11, 2020

(65) Prior Publication Data

US 2020/0296498 A1  Sep. 17, 2020

(30) Foreign Application Priority Data

Mar. 13, 2019 (KR) .................. 10-2019-0028984

(51) Int. Cl.
| | |
|---|---|
| *H04R 1/08* | (2006.01) |
| *G06F 3/16* | (2006.01) |
| *G06F 3/0482* | (2013.01) |
| *G10L 15/26* | (2006.01) |
| *H04W 4/80* | (2018.01) |
| *H04L 29/06* | (2006.01) |
| *G06F 3/0483* | (2013.01) |

(52) U.S. Cl.
CPC .............. *H04R 1/08* (2013.01); *G06F 3/0482* (2013.01); *G06F 3/0483* (2013.01); *G06F 3/167* (2013.01); *G10L 15/26* (2013.01); *H04L 65/60* (2013.01); *H04W 4/80* (2018.02); *H04R 2420/07* (2013.01)

(58) Field of Classification Search
CPC ....... H04R 1/08; H04R 2420/07; H04W 4/80; H04M 2201/40; H04M 1/72561; H04M 3/4938; G06F 3/0482; G06F 3/0483; G06F 3/167; G10L 15/22; G10L 15/26; G10L 15/30; G10L 2015/223; G10L 13/00; G10L 2015/088; G10L 15/08; G10L 25/78; G10L 13/08; G10L 21/00; H04L 65/60
USPC ................................................ 381/110, 122
See application file for complete search history.

(56) References Cited

U.S. PATENT DOCUMENTS 8,595,771 B1 * 11/2013 Sharma .............. H04N 21/4314
725/52
8,745,650 B1 * 6/2014 Bachman ............... H04H 20/10
725/14

(Continued)

FOREIGN PATENT DOCUMENTS

JP 2012-500526 A 1/2012
JP 2017-173530 A 9/2017

(Continued)

*Primary Examiner* — Norman Yu
(74) *Attorney, Agent, or Firm* — Sughrue Mion, PLLC

(57) ABSTRACT

A system for controlling a smart microphone includes a smart microphone configured to receive and transfer a voice of a user, the smart microphone including a plurality of buttons, a control server configured to, when the voice of the user is received through the smart microphone, convert the voice into a text, extract text, matching a command stored in a command database (DB), as a command from a converted text, and transfer a function corresponding to the extracted command to the user terminal, and a user terminal configured to receive a command from the control server to execute a function corresponding to the received command.

11 Claims, 7 Drawing Sheets

(56) References Cited

U.S. PATENT DOCUMENTS

| | | | |
|---|---|---|---|
| 8,989,420 B1* | 3/2015 | Hamer | H04R 1/02 |
| | | | 381/355 |
| 2004/0122542 A1* | 6/2004 | Yang | H04M 1/6066 |
| | | | 700/94 |
| 2010/0014459 A1* | 1/2010 | Mir | H04L 61/2557 |
| | | | 370/328 |
| 2010/0041447 A1* | 2/2010 | Graylin | G10L 15/26 |
| | | | 455/575.2 |
| 2016/0098157 A1* | 4/2016 | Kim | G06F 3/167 |
| | | | 715/738 |
| 2019/0310683 A1* | 10/2019 | Son | G06F 1/1605 |

FOREIGN PATENT DOCUMENTS

| | | |
|---|---|---|
| JP | 2018-159964 A | 10/2018 |
| KR | 10-2011-0121296 A | 11/2011 |
| KR | 10-2013-0018464 A | 2/2013 |
| KR | 10-2013-0122359 A | 11/2013 |

\* cited by examiner

CASE 1: REPLAY MUSIC/VIDEO IN CLASS
"REPLAY TEXTBOOK MUSIC ARMS ON SHOULDERS"

CASE 2: EXECUTE CLASS TOOL IN CLASS
"EXECUTE PRESENTATION HELPER ~"

CASE 3: WHEN CHILDREN ARE CHATTERING IN CLASS
PRESS NO. 1 HOT KEY

CASE 4: I WANT TO ALLOW
CHILDREN TO LISTEN TO A MERRY SONG
AT BREAK...PRESS NO. 4 HOT KEY

UNDERSTANDING/DETERMINING OF COMMAND.
SERVICE ACCESS

UNDERSTANDING/DETERMINING OF COMMAND.
SERVICE ACCESS

UNDERSTANDING/DETERMINING
OF HOT KEY SET BY TEACHER. SERVICE ACCESS

UNDERSTANDING/DETERMINING OF
HOT KEY SET BY TEACHER. SERVICE ACCESS

SERVER AND SYSTEM FOR CONTROLLING SMART MICROPHONE

CROSS-REFERENCE TO RELATED APPLICATIONS

This application claims priority under 35 U.S.C. § 119 to Korean Patent Application No. 10-2019-0028984, filed on Mar. 13, 2019, the disclosure of which is incorporated herein by reference in its entirety.

TECHNICAL FIELD

The present invention relates to a server and system for controlling a smart microphone.

BACKGROUND

Voice recognition technology is technology that recognizes a voice signal, obtained by collecting voices input by a user and the like, as a signal corresponding to a certain language and may be applied to various fields.

Particularly, in electronic devices such as televisions (TVs) and portable phones, in addition to a conventional input method using a remote controller, functions of controlling a device on the basis of voice recognition based on a microphone are being added.

For example, in controlling a channel of a TV, a specific word "channel up" may be input as a voice, and the channel may be controlled by recognizing a voice signal of a user through a voice recognition engine of the TV.

In the spots of education such as schools, a lecture is provided to students on the basis of various pieces of content by using a display apparatus and a speaker, and the above-described voice recognition function is realized through a microphone attached on an artificial intelligence (AI) speaker which has been widely distributed to each home recently.

However, since the AI speaker has a problem of voice recognition performance and noise caused by various persons, it is difficult to apply the AI speaker to the spots of education.

Moreover, when the conventional AI speaker is always receiving all voices in a standby mode and then receives a voice corresponding to a command, the conventional AI speaker processes the command. Due to this, even when a similar syllable is received, an error where the conventional AI speaker processes the received syllable like call occurs.

SUMMARY

Accordingly, the present invention provides a server and system for controlling a smart microphone, in which, when a voice of a user is received through the smart microphone, the server recognizes a corresponding voice to extract the recognized voice as a command and allows a user terminal to perform a function corresponding to the extracted command.

The objects of the present invention are not limited to the aforesaid, but other objects not described herein will be clearly understood by those skilled in the art from descriptions below.

In one general aspect, a system for controlling a smart microphone includes a smart microphone configured to receive and transfer a voice of a user, the smart microphone including a plurality of buttons, a control server configured to, when the voice of the user is received through the smart microphone, convert the voice into a text, extract text, matching a command stored in a command database (DB), as a command from a converted text, and transfer a function corresponding to the extracted command to the user terminal, and a user terminal configured to receive a command from the control server to execute a function corresponding to the received command.

In an embodiment, the user terminal may execute the function corresponding to the received command through a dedicated browser previously installed therein, and the received command may include a command based on the voice and a command based on a hot key button included in the smart microphone.

In an embodiment, when the voice is received through the smart microphone in a state where the user inputs a command button of the plurality of buttons, the control server may extract a command from the voice.

In an embodiment, when a hot key button of the plurality of buttons is received by the user through the smart microphone, the control server may execute a predetermined function corresponding to the hot key button by using the user terminal.

In an embodiment, when a voice for controlling a webpage is received through the smart microphone from the user in a state where the webpage is output through the dedicated browser in the user terminal, the control server may capture the webpage currently output in the dedicated browser and may compare the captured webpage with a command matching the received voice to allow the user terminal to output a result of the comparison.

In an embodiment, when the user utters, through the smart microphone, all or some of texts corresponding to one of a plurality of items displayed on the webpage, the control server may convert a voice, all uttered or some uttered by the user, into a text and may compare a converted text with the plurality of items displayed on the webpage to control the user terminal so that a corresponding item is selected.

In an embodiment, one or more of a teaching schedule and a schedule corresponding to a grade-based class course may be previously stored in the control server, and when the user inputs, through the smart microphone, a command for performing current class content, the control server may allow the user terminal to display content corresponding to class content matching one or more of the teaching schedule and the schedule.

In an embodiment, the control server may compare one or more of the teaching schedule and the schedule with a date and a time at which the command is input and may allow the user terminal to display content corresponding to class content.

In an embodiment, the smart microphone may include a remote controller configured to directly execute, through a button, a function and cursor control of the dedicated browser which is being executed by the user terminal, and the remote controller may be detachably coupled to an inserting groove formed in one surface of the smart microphone.

In an embodiment, Bluetooth dongle may be inserted into the user terminal and may be Bluetooth-paired with the smart microphone.

In an embodiment, the smart microphone may include a gateway configured to provide wireless Internet to an external terminal, and as the smart microphone is Bluetooth-paired with the user terminal connected to an external Internet network, the smart microphone may provide wireless Internet to an external terminal through Bluetooth paring on the basis of an Internet protocol (IP) address provided from the user terminal.

In another general aspect, a server for controlling a smart microphone includes a communication module configured to transmit or receive data to or from one or more user terminals and the smart microphone, a memory configured to store a program for controlling the smart microphone through a dedicated browser previously installed in the user terminal, and a processor configured to execute the program stored in the memory, wherein, by executing the program, when a voice of a user is received through the smart microphone, the processor converts the voice into a text, extracts text, matching a command stored in a command database (DB), as a command from a converted text, and transfers a function corresponding to the extracted command to the user terminal.

Other features and aspects will be apparent from the following detailed description, the drawings, and the claims.

DETAILED DESCRIPTION OF EMBODIMENTS

Figure 1:
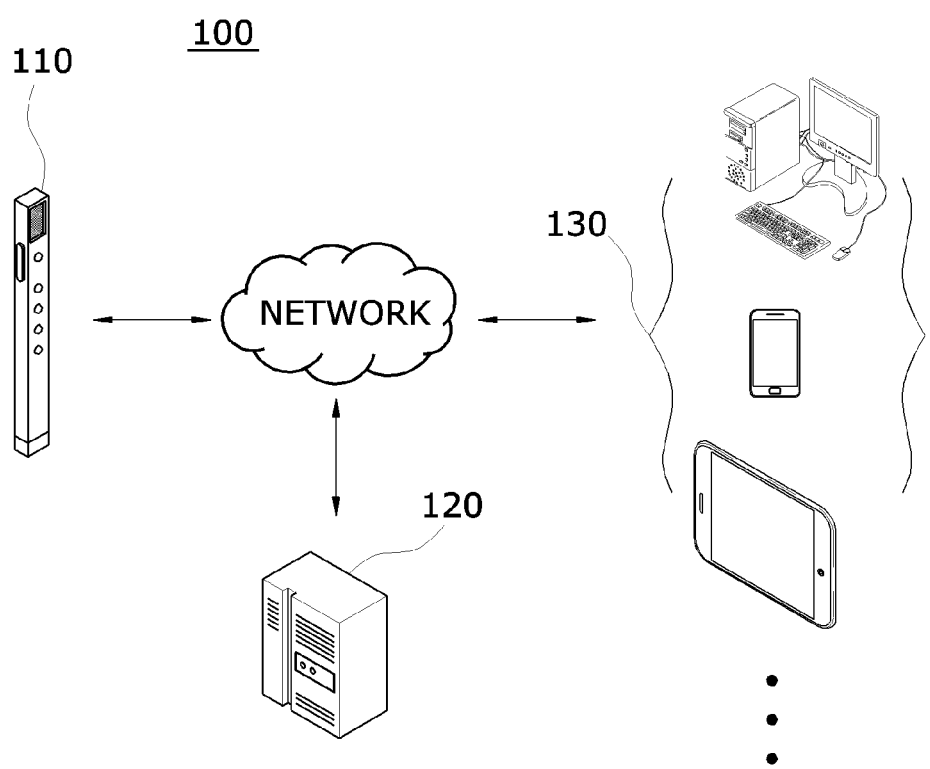
FIG. 1 is a diagram for schematically describing a smart microphone control system according to an embodiment of the present invention.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout.

Figure 2A:
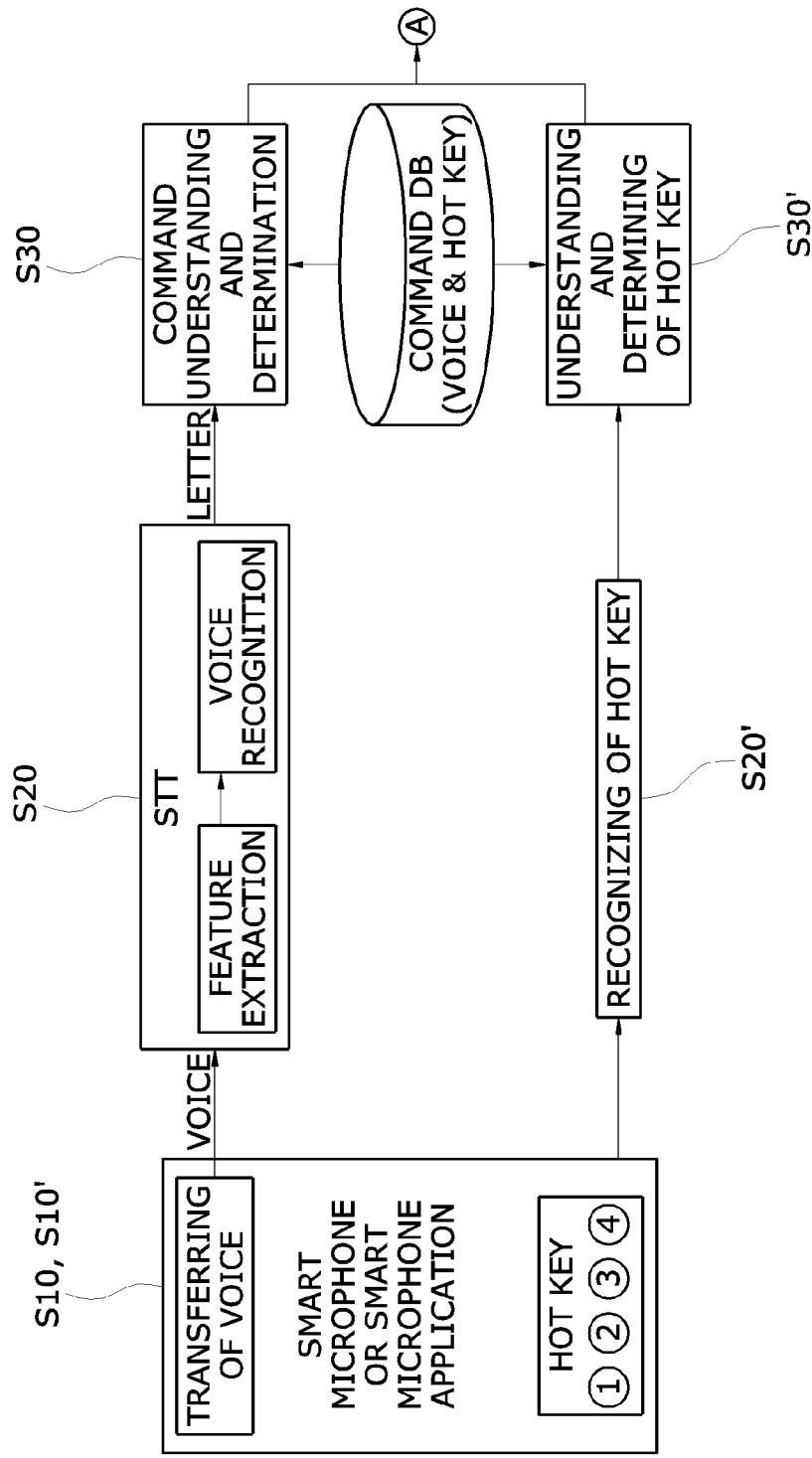
FIGS. 2A and 2B are diagrams for describing content executing a service by using a smart microphone.
Figure 2B:
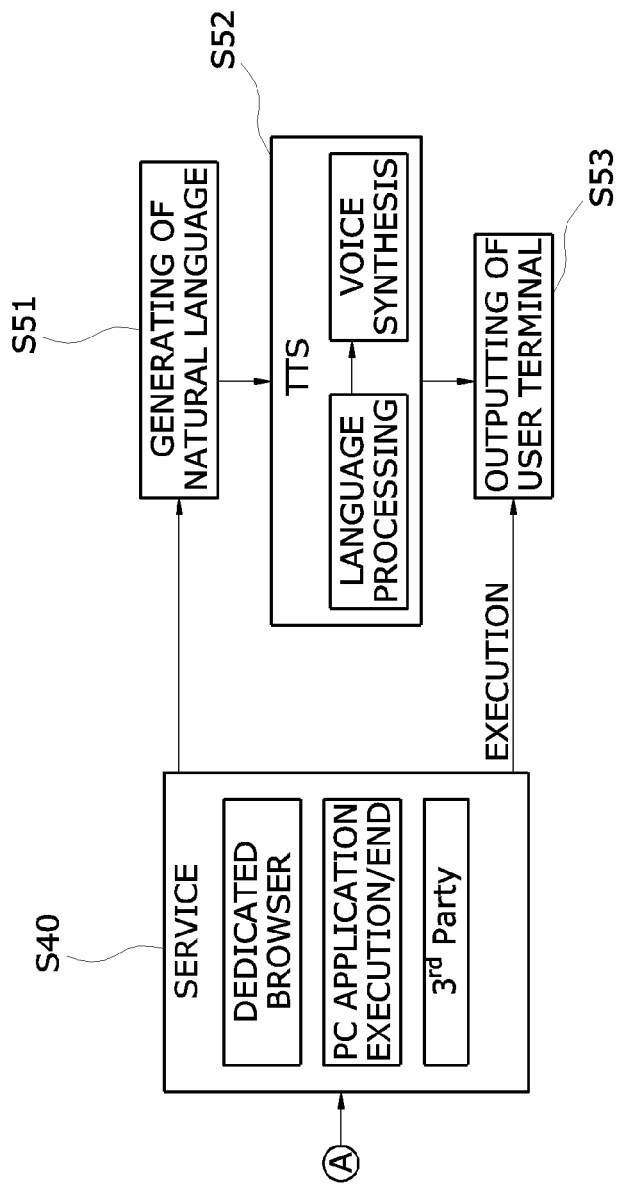
Figure 3:
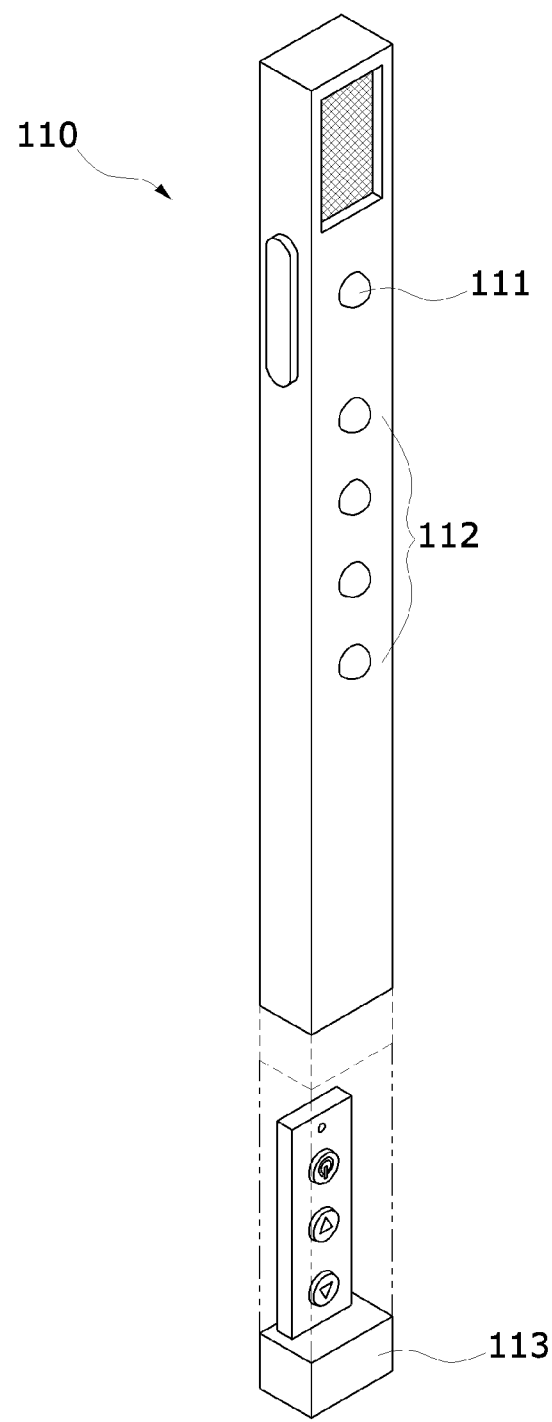
FIG. 3 is a diagram for describing a smart microphone according to an embodiment of the present invention.
Figure 4A:
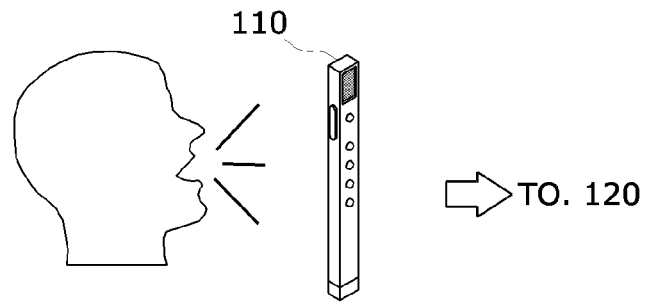
FIGS. 4A to 4C are diagrams for describing an embodiment using a smart microphone.

FIG. 1 is a diagram for schematically describing a smart microphone control system 100 according to an embodiment of the present invention. FIGS. 2A and 2B are diagrams for describing content executing a service by using a smart microphone. FIG. 3 is a diagram for describing a smart microphone according to an embodiment of the present invention. FIGS. 4A and 4C are diagrams for describing an embodiment using a smart microphone.

In an embodiment of the present invention, an example where teachers and students are in schools and educational institutes will be described, but the embodiments are not limited thereto.

The smart microphone control system 100 according to an embodiment of the present invention may include a smart microphone 110, a control server 120, and a user terminal 130.

In this case, the elements of the smart microphone control system 100 illustrated in FIG. 1 may be connected to one another over a network. The network may denote a connection structure which enables information to exchange between nodes such as terminals and servers. Examples of the network may include 3$^{rd}$ generation partnership project (3GPP) network, long term evolution (LTE) network, world interoperability for microwave access (WIMAX) network, Internet, local area network (LAN), wireless local area network (LAN), wide area network (WAN), personal area network (PAN), Bluetooth network, satellite broadcasting network, analog broadcasting network, digital multimedia broadcasting (DMB) network, and WiFi, but are not limited thereto.

The smart microphone 110 may include a plurality of buttons (or hot key buttons) 111 and 112. Also, the smart microphone 110 may receive a user voice and may transfer the user voice to a speaker and the control server 120.

When a user voice is received through the smart microphone 110, the control server 120 may convert the voice into a text, may extract text, matching a command stored in a command database (DB), as a command from a converted text, and transfer a function corresponding to the extracted command to the user terminal 130.

In this case, the control server 120 may be connected to the smart microphone 110 over a wireless network and may directly receive a voice. Alternatively, the control server 120 may be connected to the user terminal 130 over a wired/wireless network, and the smart microphone 110 may be connected to the user terminal as a type paired with each other.

The user terminal 130 may receive a command from the control server 120 to execute a function corresponding to a corresponding command. The user terminal 130 may be provided as one or more for each class.

The user terminal 130 may execute a function corresponding to the command on the basis of a dedicated browser previously installed therein. Here, the command may be a command based on a voice, or may be a command based on the hot key buttons 111 and 112 included in the smart microphone 110.

The user terminal 130 may be implemented as a personal computer (PC), and for example, may be implemented as a wireless communication device with ensured portability and mobility like smartphones, notebook computers, and tablet PCs.

Bluetooth dongle may be inserted into the user terminal 130 and may be Bluetooth-paired with the smart microphone 110.

In this case, the smart microphone 110 may include a gateway for providing wireless Internet to an external terminal, and as the smart microphone 110 is Bluetooth-paired with the user terminal 130 connected to an external Internet network, the smart microphone 110 may provide wireless Internet to the external terminal through Bluetooth paring on the basis of an Internet protocol (IP) address provided from the user terminal 130.

The dedicated browser installed in the user terminal 130 may be a program which recognizes a command of the smart microphone 110 to control Web or to execute a function of a hot key.

In an embodiment of the present invention, the smart microphone 110 may control all functions provided by the dedicated browser.

For example, the smart microphone 110 may fundamentally recognize a command, convert the recognized command into a text, and execute a control function. Also, for example, a program such as PowerPoint or Excel previously installed in the user terminal 130 may be executed by the dedicated browser or through the dedicated browser, and fine dust information or weather information provided by a third party information providing agent may be displayed on the dedicated browser.

Moreover, a webpage may be executed through the dedicated browser, and as described below, a function of searching and controlling a webpage may be provided through the smart microphone 110.

In addition, banner advertisement which frequently appears in a webpage may be automatically blocked, a common favorites function may be provided on a site which corresponds to education and is frequently used by teachers, or important facts such as education-related news may be displayed on a lower end of a browser.

Moreover, an automatic login function encrypted for security may be provided, and teacher-customized advertisement and news may be provided by collecting Web history facts of Web accessing a browser.

Referring to FIGS. 2A, 2B and 3, when a user utters usually without pressing an arbitrary button in a powered-on state, the smart microphone 110 may operate a general wireless microphone.

The smart microphone 110 may include the plurality of buttons 111 and 112, and in detail, the smart microphone 110 may include a command button 111 and one or more hot keys 112.

In general wireless microphones, a radio frequency (RF) may be used instead of Bluetooth, and in this case, there may be a problem where it is difficult to extract accurate data due to severe interference. Also, since a wireless microphone using an RF uses an analog signal, it may be unable to transmit or receive data by pressing a button.

On the other hand, in an embodiment of the present invention, data may be transmitted or received based on Bluetooth pairing, and thus, the occurrence of the problem may be prevented.

The command button 111 may be a button for recognizing a user voice. In step S10, the smart microphone 110 may operate as a general wireless microphone in a state where the command button 111 is not pressed, and then, when the command button 111 is pressed, the smart microphone 110 may transmit a corresponding voice to the control server 120.

When a voice of a user is received through the smart microphone 110 in a state where the user presses the command button 111 among the plurality of buttons 111 and 112, the control server 120 may convert a corresponding voice into a text in step S20. In this process, the control server 120 may extract a feature from the voice of the user by using speech to text (STT) technology.

Moreover, the control server 120 may extract text, matching a command stored in the command DB, as a command from a converted text in step S30 and may transfer a function corresponding to the extracted command to the user terminal 130 in step S40.

Figure 4B:
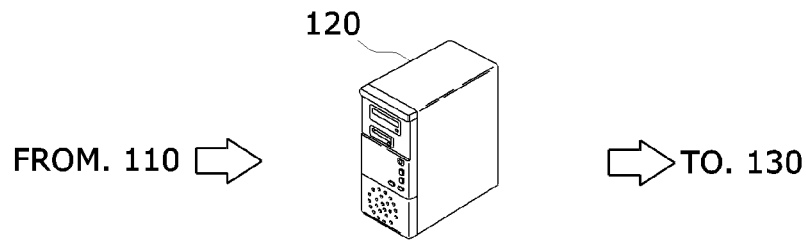
Figure 4C:
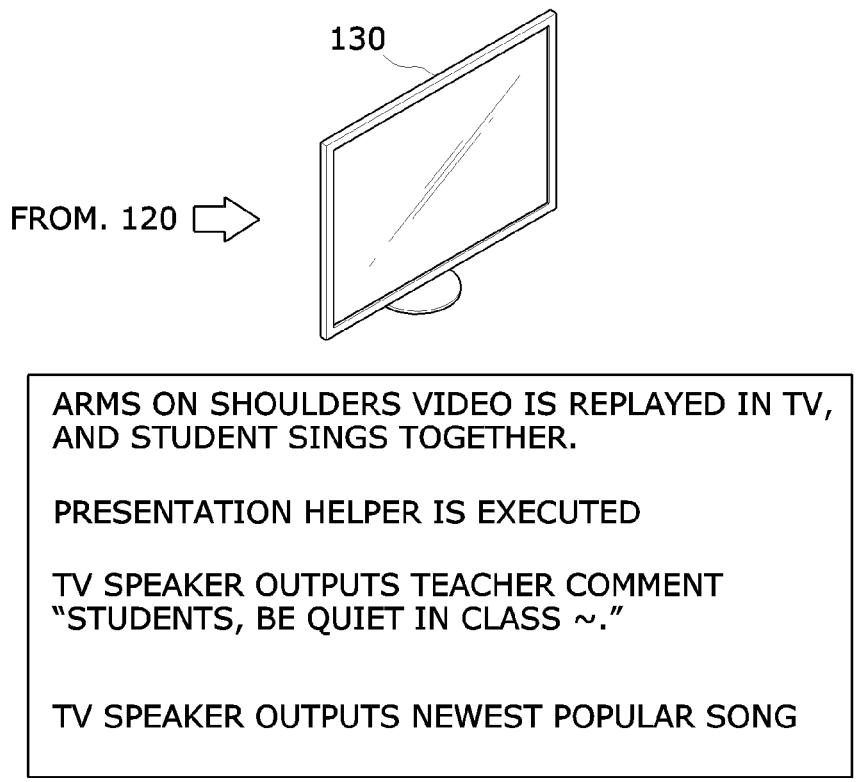

Referring to FIGS. 4A to 4C, when a teacher utters "replay textbook music arms on shoulders" in a state of pressing the command button 111 of the buttons 111 and 112 of the smart microphone 110 while the teacher is performing class by using the smart microphone 110 as a general wireless microphone, the control server 120 may respectively extract "textbook music", "arms on shoulders", and "replay" as texts from the utterance "replay textbook music arms on shoulders" and may determine whether each of the extracted texts matches a command stored in the command DB.

Moreover, when it is determined that "textbook music" is in the command DB and there is content corresponding to "arms on shoulders" among "textbook music", the control server 120 may provide content "arms on shoulders" to the user terminal 130. Also, the control server 120 may transfer, to the user terminal 130, a control message for executing a viewing function matching a command "replay".

Therefore, the user terminal 130 may replay a content video "arms on shoulders" by using a display apparatus, and students may view the content video to learn therefrom.

As another example, when the teacher utters "execute presentation helper" for executing a class tool in a state of pressing the command button 111 of the buttons 111 and 112 of the smart microphone 110 while the teacher is performing class by using the smart microphone 110, the control server 120 may respectively extract "presentation helper" and "execute" as texts from the utterance "execute presentation helper" and may determine whether each of the extracted texts matches a command stored in the command DB.

Moreover, when it is determined that a program corresponding to "presentation helper" is in the user terminal 130 or the control server 120, the control server 120 may transfer, to the user terminal 130, a control message for executing "presentation helper".

Therefore, the user terminal 130 may execute a class tool program "presentation helper" to allow a presentation class of students to be performed.

According to another embodiment of the present invention, when the length of text is long or when the text comprises special character, character recognition may be difficult. When the user presses the command button 111, a number is generated before the text, and when the user reads the number, the presentation helper may be executed.

Referring again to FIG. 3, when an input based on the hot key button 112 selected by a user from among the plurality of buttons 111 and 112 is received from the smart microphone 110 in step S10', the control server 120 may perform a process of recognizing the hot key button 112 in step S20', compare a predetermined function corresponding to the hot key button 112 with a function stored in the command DB to detect a corresponding function in step S30', and allow the user terminal 130 to execute the detected function in step S40.

For example, the hot key button 112 may be for executing a program which is frequently used by a user and may be previously defined and set by the user. A setting of the hot key button 112 may be performed by designating, through the user terminal 130, the program which is frequently used by the user.

Referring to FIGS. 4A and 4C, when a teacher determines that students are chattering in the middle of performing a class by using the smart microphone 110 and presses No. 1 hot key button among the buttons of the smart microphone 110, the control server 120 may allow the user terminal 130 to execute a function corresponding the No. 1 hot key button.

As a result, a phrase and a message "students, be quiet in class ~" may be output through a display and a speaker of the user terminal 130.

As another example, when the teacher presses No. 4 hot key button among the buttons of the smart microphone 110 so as to allow students to listen to a song by using the user terminal 130 at break, the control server 120 may allow the user terminal 130 to execute a function corresponding the No. 4 hot key button, and thus, a newest song may be replayed through the display and the speaker of the user terminal 130.

In this case, the hot key button 112 may be input by using the plurality of buttons installed in the smart microphone 110, but may be input through the user terminal 130 (i.e., an application previously installed in a personal computer (PC) or a smartphone) which is pairing with the smart microphone 110.

Moreover, in an embodiment of the present invention, the control server 120 may generate a natural language on the basis on a result of service execution in step S51, convert a phrase corresponding to the service into a voice by using the TTS technology in step S52, and allow the user terminal 130 to output the voice in step S53.

In an embodiment of the present invention, the smart microphone 110 may control a webpage output in the dedicated browser.

That is, the user terminal 130 may execute the dedicated browser, and when a voice for controlling the webpage is received through the smart microphone 110 from the user in a state where the webpage is output in the dedicated browser, the control server 120 may capture the webpage which is currently output in the dedicated browser and may compare the captured webpage with a command matching the received voice to allow the user terminal 130 to output a result of the comparison.

In this case, when the user utters, through the smart microphone 110, all or some of texts corresponding to one of a plurality of items displayed on the webpage, the control server 120 may convert a voice, all uttered or some uttered by the user, into a text and may compare a converted text with the plurality of items displayed on the webpage to control the user terminal 130 in order for a corresponding item to be selected.

For example, when Google webpage is being displayed in the user terminal 130 and a teacher utters a word "physics" in a state of pressing the command button 111 or the hot key button 112 for searching the webpage of the smart microphone 110, the control server 120 may capture the Google webpage currently displayed on a screen of the user terminal 130 and may extract a word "physics" from the captured Google webpage to determine whether the extracted word matches the word "physics" uttered by the teacher.

Moreover, when the extracted word matches the word "physics" uttered by the teacher as a result of the comparison, the control server 120 may allow an item including the word "physics" to be selected and clicked and to be converted into a corresponding webpage.

Moreover, even when the user utters only the word "physics" in association with an item included in "physics" displayed on the Google webpage or utters "physics theory" corresponding to all or some phrases of a corresponding item, the control server 120 may convert all utterance or some utterance into a text to allow a corresponding item to be selected from the captured Google webpage.

Furthermore, the smart microphone control system 100 according to an embodiment of the present invention may perform control through the smart microphone 110 so that class content matching a schedule and a teaching schedule is automatically executed through the dedicated browser.

That is, one or more of a teaching schedule and a schedule corresponding to a grade-based class course may be previously stored in the control server 120. In this state, when the user inputs, through the smart microphone 110, a command for performing current class content, the control server 120 may allow the user terminal 130 to display content corresponding to class content matching one or more of the teaching schedule and the schedule.

In this case, the control server 120 may compare one or more of the teaching schedule and the schedule with a date and a time at which a command is input and may allow the user terminal 130 to display content corresponding to class content.

For example, the teaching schedule may be classified on a year basis, a grade basis, and a quarter basis for each year and may be provided to each school and each class by the education office, and based thereon, teachers may perform classes of students.

Moreover, the schedule may be written based on the number of teachers and the number of classes for each school, and based thereon, classes of students may be performed by units of time.

At this time, when the teacher utters a comment "replay today's class content" so as to start to perform class through the smart microphone 110 on a specific date (for example, at 10 a.m. on March 2), the control server 120 may allow the user terminal 130 to display class content "base of differentiation" of "mathematics" subject with reference to a schedule and a teaching schedule corresponding to 10 a.m. on March 2.

Therefore, a teach may sufficiently perform class by using only one command based on the smart microphone 110 without needing to move class content stored in a separate storage space such as a universal serial bus (USB) memory or an e-mail each time.

To this end, in an embodiment of the present invention, class content corresponding to a teaching schedule or a schedule should be stored in the control server 120 before the user performs class by using the smart microphone 110.

Referring again to FIG. 3, in an embodiment of the present invention, the smart microphone 110 may directly execute, through a button, a function and cursor control of the dedicated browser which is being executed by the user terminal 130.

Such a button may be formed at a portion grasping the smart microphone 110 along with a command button and a hot key, but may be formed as a separate remote controller 113 type which is detachably coupled to an inserting groove formed in one surface of the smart microphone 110.

That is, in a case where a user should utter in a state of grasping the smart microphone 110 with one hand always and should control a cursor of the dedicated browser or select and execute a function, the smart microphone 110 may distance from a mouth, and due to this, it may be difficult to accurately transfer class content.

Therefore, in an embodiment of the present invention, when the user pulls a lower end of the smart microphone 110, the remote controller 113 for controlling a dedicated program may be detached therefrom, and thus, the occurrence of the above-described problem may be prevented and the dedicated browser may be controlled simultaneously.

Figure 5:
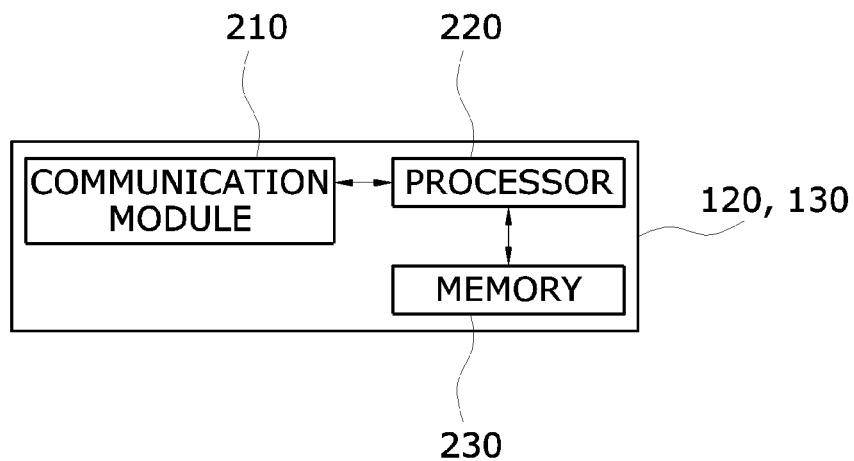
FIG. 5 is a block diagram of a user terminal and a control server according to an embodiment of the present invention.

FIG. 5 is a block diagram of the control server 120 and the user terminal 130 according to an embodiment of the present invention.

The control server 120 and the user terminal 130 according to an embodiment of the present invention may each include a communication module 210, a memory 230, and a processor 220.

The communication module 210 may transmit or receive data over a network. The communication module 210 may include a wired communication module and a wireless communication module. The wired communication module may be implemented with a power line communication device, a telephone wire communication device, a cable home (MoCA), Ethernet, IEEE1294, an integration wired home network, an RS-485 control device, and/or the like. Also, the wireless communication module may be implemented with wireless local area network (WLAN), Bluetooth, HDR WPAN, UWB, ZigBee, Impulse Radio, 60 GHz WPAN, Binary-CDMA, wireless USB technology, wireless HDMI technology, and/or the like.

The memory 230 may store a program for executing a dedicated browser or processing a command based on the smart microphone 110, and the processor 220 may execute the program stored in the memory 230. Here, the memory 230 may denote a generic name for a volatile memory device and a non-volatile memory device which continuously maintains stored information even when power is cut off Examples of the memory 230 may include NAND flash memory such as compact flash (CF) card, secure digital (SD) card, memory stick, solid state drive (SSD), and micro SD card, magnetic computer memory device such as hard disk drive (HDD), and optical disc drive such as CD-ROM and DVD-ROM.

The processor 220 may control and execute the elements illustrated in FIG. 1. To this end, the processor 220 may be implemented as software or a hardware type such as a central processing unit (CPU), a field programmable gate array (FPGA), or an application specific integrated circuit (ASIC) and may perform certain functions.

However, "elements" are not meanings limited to software or hardware, and each element may be configured to reside in an addressable storage medium and configured to execute on one or more processors.

Thus, an element may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

The method according to the embodiments of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system according to the embodiments of the present invention have been described in association with a specific embodiment, but their elements, some operations, or all operations may be implemented by using a computer system having general-use hardware architecture.

As described above, a physical size of a fiducial marker according to the embodiments of the present invention may be minimized, and moreover, ID bit information may be inserted into the fiducial marker as much as possible. Also, the fiducial marker according to the embodiments of the present invention may be robust to viewpoint distortion and may provide orientation information.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

As described above, according to the embodiments of the present invention, a user may easily control a function provided by a dedicated browser by using only the smart microphone, based on a voice or a button.

Moreover, according to the embodiments of the present invention, pieces of information provided by a third party providing agent or various programs executed through a dedicated browser and installed in a computer may be controlled to be executed and output through the smart microphone, and a webpage search and item selection function based on the dedicated browser may be provided.

Moreover, according to the embodiments of the present invention, by using the smart microphone, a user terminal may output class content corresponding to a schedule and a teaching schedule corresponding to a specific date and time, thereby solving a problem where a teacher performing a class stores class content in a storage medium and executes the stored class content each time.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for controlling a smart microphone, the system comprising:
    a user terminal;
    a smart microphone configured to receive and transfer a voice of a user, the smart microphone including a plurality of buttons; and
    a control server configured to, when the voice of the user is received through the smart microphone, convert the voice into a text, extract a text, which matches a command stored in a command database (DB), as a command from the converted text, and transfer a function corresponding to the extracted command to the user terminal,
    wherein the user terminal is configured to receive a command from the control server to execute a function corresponding to the received command,
    wherein the smart microphone comprises a remote controller configured to control, through a button on the remote controller, execution of a function and a cursor control of a dedicated browser which is being executed by the user terminal, and
    wherein the remote controller is detachably coupled to an inserting groove formed on the smart microphone.

2. The system of claim 1, wherein
the user terminal executes the function corresponding to the received command through a dedicated browser previously installed therein, and
the received command includes a command based on the voice and a command based on a hot key button included in the smart microphone.

3. The system of claim 2, wherein, when the voice is received through the smart microphone in a state where the user inputs a command button of the plurality of buttons, the control server extracts a command from the voice.

4. The system of claim 2, wherein, when the hot key button of the plurality of buttons is received by the user through the smart microphone, the control server executes a predetermined function corresponding to the hot key button by using the user terminal.

5. The system of claim 2, wherein, when a voice for controlling a webpage is received through the smart microphone from the user in a state where the webpage is output through the dedicated browser in the user terminal, the control server captures the webpage currently output in the dedicated browser and compares the captured webpage with a command matching the received voice to allow the user terminal to output a result of the comparison.

6. The system of claim 5, wherein, when the user utters, through the smart microphone, all or some of texts corresponding to one of a plurality of items displayed on the webpage, the control server converts a voice, all uttered or some uttered by the user, into a text and compares the converted text with the plurality of items displayed on the webpage to control the user terminal so that a corresponding item is selected.

7. The system of claim 2, wherein
one or more of a teaching schedule and a class schedule corresponding to a grade-based class course are previously stored in the control server, and
when the user inputs, through the smart microphone, a command for performing current class content, the control server allows the user terminal to display content corresponding to class content matching one or more of the teaching schedule and the class schedule.

8. The system of claim 7, wherein the control server compares one or more of the teaching schedule and the class schedule with a date and a time at which the command is input and allows the user terminal to display content corresponding to class content.

9. The system of claim 1, wherein Bluetooth dongle is inserted into the user terminal and is Bluetooth-paired with the smart microphone.

10. The system of claim 9, wherein
the smart microphone comprises a gateway configured to provide wireless Internet to an external terminal, and
as the smart microphone is Bluetooth-paired with the user terminal connected to an external Internet network, the smart microphone provides wireless Internet to the external terminal through Bluetooth paring based on an Internet protocol (IP) address provided from the user terminal.

11. A server for controlling a smart microphone, the server comprising:
a communication module configured to transmit or receive data to or from one or more user terminals and the smart microphone;
a memory configured to store a program for controlling the smart microphone through a dedicated browser previously installed in the one or more user terminals; and
a processor configured to execute the program stored in the memory,
wherein, by executing the program, when a voice of a user is received through the smart microphone, the processor converts the voice into a text, extracts a text, which matches a command stored in a command database (DB), as a command from the converted text, and transfers a function corresponding to the extracted command to a user terminal among the one or more user terminals,
wherein one or more of a teaching schedule and a class schedule corresponding to a grade-based class course are previously stored in the server, and
wherein the processor is configured to, based on an input, through the smart microphone, of a command for performing current class content, compare one or more of the teaching schedule and the class schedule with an input time of the command, and allow the user terminal to display content corresponding to the one or more of the teaching schedule and the class schedule that matches with the input time.

* * * * *